Figure 1:
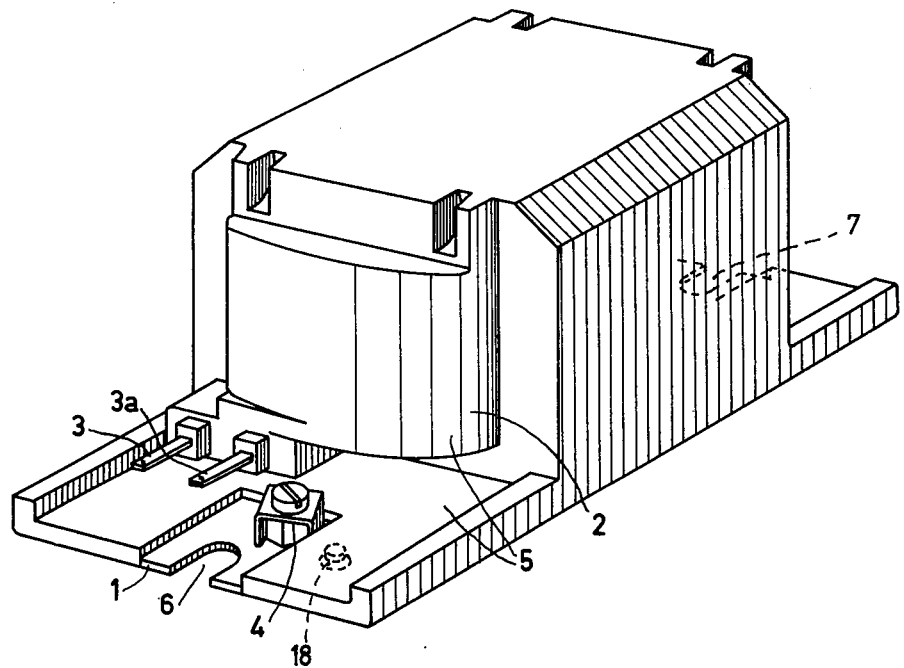

United States Patent [19]

Van Der Hoek et al.

[11] Patent Number: 4,460,883
[45] Date of Patent: Jul. 17, 1984

[54] STABILIZATION BALLAST FOR OPERATING A GAS AND/OR VAPOR DISCHARGE LAMP

[75] Inventors: Jan L. Van Der Hoek; Bartholomeus W. M. Blom, both of Oss, Netherlands

[73] Assignee: U.S. Philips Corporation, New York, N.Y.

[21] Appl. No.: 350,487

[22] Filed: Feb. 19, 1982

[30] Foreign Application Priority Data

Mar. 25, 1981 [NL] Netherlands ........................ 8101468

[51] Int. Cl.³ ...................... H01F 15/02; H01F 27/06
[52] U.S. Cl. ............................... 336/65; 174/DIG. 2; 361/377; 336/96
[58] Field of Search .............................. 264/274, 273; 174/52 PE, DIG. 2; 336/65, 96; 361/346, 387, 377, 417, 418, 419, 420

[56] References Cited

U.S. PATENT DOCUMENTS

| 3,049,579 | 8/1962 | Sulzer | 174/DIG. 2 |
| 3,138,774 | 6/1964 | Derbyshire et al. | 336/65 |
| 3,207,955 | 9/1965 | Von Hoorn | 361/346 |
| 3,522,345 | 7/1970 | Olsen | 264/273 |
| 3,611,046 | 10/1971 | Covent | 361/387 |

FOREIGN PATENT DOCUMENTS

| 7611328 | 4/1978 | Netherlands | 336/65 |
| 1455274 | 11/1976 | United Kingdom | 336/65 |

Primary Examiner—Thomas J. Kozma
Attorney, Agent, or Firm—Robert T. Mayer; Bernard Franzblau

[57] ABSTRACT

An inductive stabilization ballast including a connecting plate (1) which, at the side facing an electric coil (2) of the stabilization ballast is provided with an insulating plastic material layer (5) which, by means of conical feet 5a which cooperate with similar conical holes (8 to 23, inclusive) in the connecting plate (1), is bonded to the connecting plate.

5 Claims, 4 Drawing Figures

U.S. Patent  Jul. 17, 1984  Sheet 1 of 2  4,460,883

STABILIZATION BALLAST FOR OPERATING A GAS AND/OR VAPOR DISCHARGE LAMP

This invention relates to a stabilization ballast for operating a gas and/or vapour discharge lamp, incorporating an electric coil and a metal connecting plate.

A prior art stabilization ballast of the type described above is disclosed in, for example, U.S. Pat. No. 4,208,616. A stabilization ballast is arranged in series with a discharge lamp. Such a stabilization ballast is necessary since as a rule a discharge lamp has a negative current-versus-voltage characteristic.

A disadvantage of that prior art ballast is that the connecting plate is not, or is hardly, covered by insulating material at the side contiguous to the coil. This renders said ballast less suitable for uses in which high electric voltages may be applied to the coil.

The invention has for an object to provide a stabilization ballast of the type described in the opening paragraph wherein the connecting plate is covered in a simple and effective manner by insulating material.

According to the invention a stabilization ballast for operating a gas and/or vapour discharge lamp, incorporating an electric coil and a metal connecting plate is characterized in that at least on the side contiguous to the coil the connecting plate is covered with a layer of an electrically-insulating plastic material and that the connecting plate is provided with a hole the cross-section of which is largest at the side remote from the coil, and the hole is filled with a plastic material of the same composition as that of the layer, and that said filling forms one whole with the layer.

This stabilization ballast has the advantage that the connecting plate is covered in a simple and effective manner by the plastic material. Holding the plastic material layer securely by means of the plastic material in the hole further prevents said plastics material layer from becoming detached after prolonged usage. The hole may, for example, have the form of a truncated cone, or may be provided with, for example, a stepped boundary.

In a preferred embodiment of a stabilization ballast in accordance with the invention the electric coil is also coated with a layer of plastic material.

In a next preferred embodiment of a stabilization ballast in accordance with the invention the layer consists of polyamide, and magnesium oxide is mixed through said layer. An advantage of this preferred embodiment is that good electric insulation of the ballast is combined with a very good cooling of that ballast, the reason being that the magnesium oxide (MgO) results in improved heat-conducting properties of the covering layer.

Figure 2:
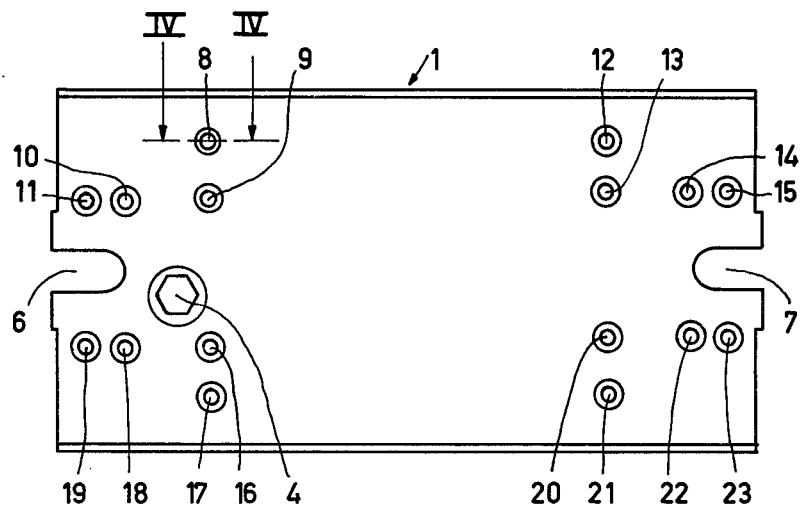
Figure 3:
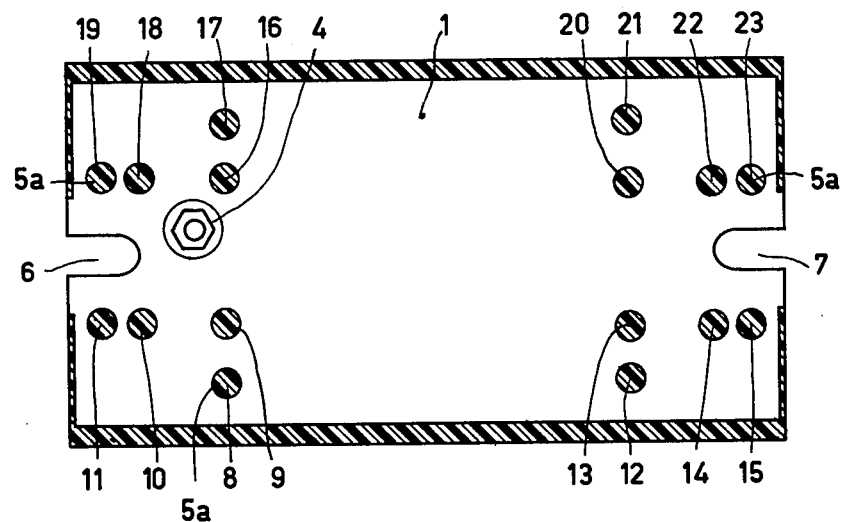
Figure 4:
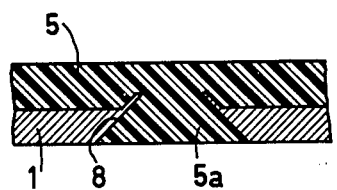

An embodiment of the invention will now be further described by way of example with reference to the accompanying drawing, in which:

FIG. 1 is a perspective view of a stabilization ballast in accordance with the invention, FIG. 2 is a top elevational view of the connecting plate of the stabilization ballast of FIG. 1 before said plate has been provided with a plastic material layer, FIG. 3 is a bottom view of the connecting plate of the stabilization ballast of FIG. 1 after the plastic material layer has been provided, and FIG. 4 shows a portion of a longitudinal section through the connecting plate in the region of a hole.

In FIG. 1 reference numeral 1 denotes a metal connecting plate of an inductive stabilization ballast. The plate 1 is approximately 6 cm wide, 11 cm long and 0.5 mm thick.

Reference numeral 2 denotes the outline of an electric coil which is covered by a plastic layer 5 so that the coil is not visible. The coil is predominantly located in the window (not shown) of a stack of laminations consisting of E and I laminations (not shown). However, other shapes are alternatively possible. Reference numerals 3 and 3a denote terminals of the electric coil. Component 4 is a grounding terminal provided on the connecting plate 1. The above-mentioned stack of laminations is clamped between two raised edge portions of the connecting plate 1.

A plastic material layer 5 envelopes the electric coil and also covers the major portion of that side of the connecting plate 1 which faces the coil 2.

This inductive stabilization ballast has a value of approximately 0.6 Henry. It is intended for stabilizing the electric current through a high-pressure sodium vapour discharge lamp of approximately 70 Watt.

Reference numerals 6 and 7 denote holes for the mechanical connection of this ballast to, for example, the interior of a luminaire provided with a sodium lamp of the described type.

In FIG. 2 the reference numerals have the same meaning as the corresponding numerals of FIG. 1. In addition, FIG. 2 shows sixteen holes (8 to 23, inclusive) in the plate 1. These holes have the form of a truncated cone. The smallest cross-section of each of those sixteen holes is at the top, that is to say at the side facing the electric coil 2.

FIG. 3 shows the bottom side of the connecting plate 1 of the finished stabilization ballast of FIG. 1. Also in this FIG. 3 the reference numerals correspond to the corresponding numerals in the other Figures. The holes 8 to 23, inclusive, are filled with a plastic material 5a of the same composition as the material of layer 5 (see FIG. 1). The plastic material 5a forms one whole with the layer 5. The plastic material consists of polyamide with which magnesium oxide (MgO) has been mixed. The plastic material layer 5 and the foot-shaped plastic material portions 5a are deposited by means of, for example, an injection process, the plastic material first being softened by increasing its temperature.

That side of the connecting plate 1 remote from the coil 2 is not, or is hardly, provided with plastic material, thus making it possible to realize adequate cooling of the coil—in the operating condition—via that side.

FIG. 4 shows on a larger scale a portion of a longitudinal section (IV—IV) through the plate 1 in the region of the hole 8 having the form of a truncated cone. Also the plastic material (5, 5a) is shown.

The stabilization ballast described is adequately protected by the plastic material layer 5. Bonding said layer 5 onto the connecting plate 1 by means of the plastic material portions 5a prevents chinks from occurring between the layer 5 and the plate 1 during prolonged usage.

What is claimed is:

1. A stabilization ballast for operating a discharge lamp comprising, an electric coil supported by a metal connecting plate, the connecting plate being coated with a layer of an electrically insulating plastic material at least on that side of the connecting plate contiguous to the coil, the connecting plate being provided with one or more holes the cross-section of which is largest at the side of the plate remote from the coil, and wherein the holes are filled with a plastic material of the same composition as that of the layer so that said plastic filling forms one integral unit with the plastic layer.

2. A stabilization ballast as claimed in claim 1 wherein the coil is coated with a layer of plastic material.

3. A stabilization ballast as claimed in claim 1 or claim 2, wherein the plastic layer comprises a polyamide material with magnesium oxide mixed through said layer.

4. A ballast as claimed in claim 1 wherein said holes are in the form of a truncated cone.

5. A ballast as claimed in claim 1 wherein said holes are in the form of a step such that the plastic material is operative to secure the plastic layer to the metal connecting plate.

* * * * *